United States Patent

Ishikawa et al.

[11] Patent Number: 5,817,429
[45] Date of Patent: Oct. 6, 1998

[54] MAGNETIC RECORDING MEDIUM

[75] Inventors: Junko Ishikawa; Noriyuki Kitaori; Osamu Yoshida; Katsumi Sasaki; Katsumi Endo, all of Tochigi, Japan

[73] Assignee: Kao Corporation, Tokyo, Japan

[21] Appl. No.: 754,165

[22] Filed: Nov. 22, 1996

[30]  Foreign Application Priority Data

Nov. 30, 1995 [JP] Japan .................................. 7-313165
Sep. 25, 1996 [JP] Japan .................................. 8-253480

[51] Int. Cl.$^6$ ...................................................... G11B 5/66
[52] U.S. Cl. ..................... 428/610; 428/336; 428/694 T; 428/694 TS; 428/694 TP; 428/694 TF; 428/900
[58] Field of Search .......................... 428/694 T, 694 TS, 428/694 TP, 694 TF, 90 D, 33 G, 610

[56]  References Cited

U.S. PATENT DOCUMENTS 4,873,154  10/1989  Yosunaga ............................ 428/694 T
5,538,802   7/1996  Kitaori ................................ 428/694 T

*Primary Examiner*—Leszek Kiliman
*Attorney, Agent, or Firm*—Oblon, Spivak, McClelland, Maier & Neustadt, P.C.

[57]  ABSTRACT

A magnetic recording medium comprising a substrate and a magnetic layer, wherein the magnetic layer is an Fe—N—O magnetic layer, and a distribution of N density in a depth direction of said Fe—N—O magnetic layer has a maximum value N1 in an intermediate layer section of said Fe—N—O magnetic layer, and the maximum value N1 ranges from 20 to 50 at. %, and an area where a density value is equal to or more than half of said maximum value N1 ranges from 100 to 500 Å in a depth direction of said Fe—N—O magnetic layer. The magnetic recording medium has an excellent C/N.

15 Claims, 6 Drawing Sheets

MAGNETIC RECORDING MEDIUM

BACKGROUND OF THE PRESENT INVENTION

The present invention relates to a magnetic recording medium having an Fe—N—O magnetic film.

A magnetic recording medium of a metallic thin film type of which magnetic film is prepared through depositing or spattering process has been well known. Magnetic alloies, for example, Co—Ni, Co—Cr or the like have been used as materials for the magnetic film (layer).

Since those metals, Co, Ni, Cr or the like are expensive, inexpensive metal such as an Fe has been expected for the application.

For example, a Publication of JP-A-54023/1986 has disclosed a magnetic recording medium having a magnetic layer formed of $Fe_{1-X-Y}N_XO_Y$ (where $0.25 \leq X+Y<0.60$, X>Y). A Publication of JP-A-112043/1994 has disclosed a magnetic recording medium having an Fe—N—O magnetic layer containing 70 to 90 at. % of Fe, 5 to 15 at. % of N and 5 to 15 at. % of O. This prior art has disclosed the magnetic recording medium having the Fe—N—O magnetic layer containing 80 at. % of Fe, 5 at. % of N and 15 at. % of O. The above-described magnetic recording medium has inferior characteristics in view of recording and reproducing capabilities.

SUMMARY OF THE INVENTION

An object of the present invention is to provide a magnetic recording medium having an excellent C/N characteristic at a high range.

The object of the present invention is realized by a magnetic recording medium comprising a substrate and a magnetic layer in which the magnetic layer is formed on the substrate; the magnetic layer is an Fe—N—O magnetic layer; a distribution of N density in a depth direction of the Fe—N—O magnetic layer has a maximum value N1 in an intermediate layer section of the Fe—N—O magnetic layer; the maximum value N1 ranges from 20 to 50 at. %; and an area where a density value is equal to or more than half of the maximum value N1 ranges from 100 to 500 Å in a depth direction of the Fe—N—O magnetic layer.

The object of the present invention is realized by a magnetic recording medium in which the maximum value N1 exists at a point 500 to 2000 Å ( particularly 600 to 1500 Å) deep from a surface of the magnetic layer.

The object of the present invention is realized by a magnetic recording medium in which the maximum value N1 exists in a range from ⅓ to ⅔ depth of a thickness of the magnetic layer.

The object of the present invention is realized by a magnetic recording medium in which the maximum value N1 exists at a point 500 to 2000 Å ( particularly 600 to 1500 Å) deep from a surface of the magnetic layer and in a range from ⅓ to ⅔ depth of a thickness of the magnetic layer.

The resultant magnetic recording medium has an improved C/N characteristic at a higher range.

It is preferable that the maximum value N1 ranges from 23 at. % to 48 at. %.

It is further preferable that the area where the N density is equal to or more than half of the maximum value N1 ranges from 200 Å to 450 Å in a depth direction of the magnetic layer.

Each of N density distribution in an upper layer section and a lower layer section of the magnetic layer is less than 20 at. %, and preferably, equal to or more than 0.1 at. % and less than 20 at. %.

It is preferable that the magnetic layer contains 45 to 90 at. % (particularly 60 to 80 at. %) of Fe, 5 to 50 at. % (particularly 10 to 30 at. %) of N and 5 to 40 at. % (particularly 10 to 20 at. %) of O.

DETAILED DESCRIPTION OF THE INVENTION

Figure 1:
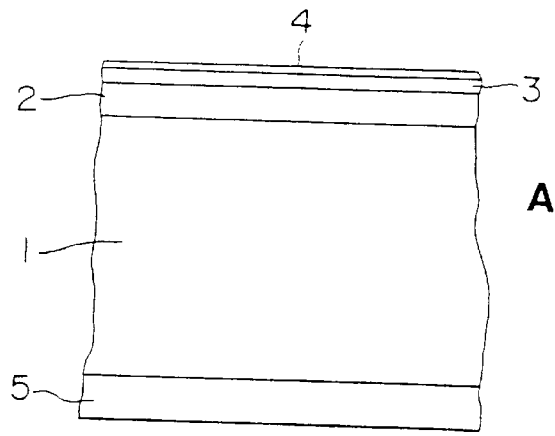
FIG. 1 is a sectional view of a magnetic recording medium.

Referring to FIG. 1, a magnetic recording medium (magnetic tape) A of the present invention comprises a substrate 1 and a magnetic layer 2. The magnetic tape A further comprises a protective layer 3 and a lubricant layer 4 in addition to the substrate 1 and the magnetic layer 2. The magnetic layer 2 is formed on the substrate 1. The magnetic layer 2 has a thickness ranging from 800 to 5000 Å, particularly from 1000 to 3000 Å. The protective layer 3 is formed on the magnetic layer 2. The protective layer 3 has a thickness ranging from 50 to 200 Å. The lubricant layer 4 is formed on the protective layer 3. The lubricant layer 4 has a thickness ranging from 5 to 70 Å.

The substrate 1 can be formed of either a magnetic material or a non-magnetic material. However most of the conventional substrates have been formed of non-magnetic materials.

The substrate 1 is formed of an organic material, for example, polyester such as polyethylene terephthalate (PET), an olefin resin such as polypropylene, polyamide, polyimide, polysulfone, polycarbonate and a cellulose resin, a vinyl chloride resin or the like. An under coat layer is coated on the surface of the substrate 1 for improving the adhesion of the magnetic layer.

The magnetic layer 2 is an Fe—N—O magnetic layer.

The magnetic layer 2 contains 45 to 90 at. % (particularly 60 to 80 at. %) of Fe, 5 to 50 at. % (particularly 10 to 30 at. %) of N and 5 to 40 at. % (particularly 10 to 20 at. %) of O.

The distribution of N density in a depth direction of the magnetic layer 2 has a maximum value N1 in an intermediate layer section of the magnetic layer 2. The maximum value N1 ranges from 20 to 50 at. %, particularly from 23 to 48 at. %.

The intermediate layer section presenting the maximum value N1 ranges from 500 to 2000 Å (particularly 600 to 1500 Å) deep from the surface of the magnetic layer 2. Or, assuming that a thickness of the magnetic layer is set as m, the intermediate layer section ranges from ⅓ m to ⅔ m deep from the surface of the magnetic layer 2. Especially, the intermediate layer section ranges from 500 to 2000 Å (particularly 600 to 1500 Å) and from (⅓)m to (⅔)m deep from the surface of the magnetic layer.

An area (a half value width of the peak) where the N density is equal to or more than half of the maximum value N1 ranges from 100 to 500 Å (particularly 200 to 450 Å).

Each of N density distribution in an upper layer section (above the intermediate layer section) and a lower layer section (below the intermediate section) is less than 20 at. %, and particularly, equal to or more than 0.1 at. % and less than 20 at. %.

The magnetic recording medium of the present invention is derived from forming a magnetic layer on a substrate through ion assist processing. The above process comprises deposition step using Fe as an evaporation source, collision step for causing nitrogen ions or activated nitrogen to collide with a deposited Fe layer and another collision step for causing oxygen ions or activated oxygen such as oxygen gas to collide with the deposited Fe layer. This process controls the range and amount of collision between the nitrogen ion or activated nitrogen and the deposited Fe layer.

Supposing that the deposition process is divided into three stages, i.e., primary stage where Fe begins to deposit on the substrate, intermediate stage for deposition and last stage where deposition is terminated, nitrogen ion or activated nitrogen is mainly supplied to a point in the intermediate stage of the deposition. As a result, Fe—N—O magnetic layer of the present invention is obtained, in which an intermediate layer section has a high N density and each upper and lower layer section has a low N density.

Figure 2:
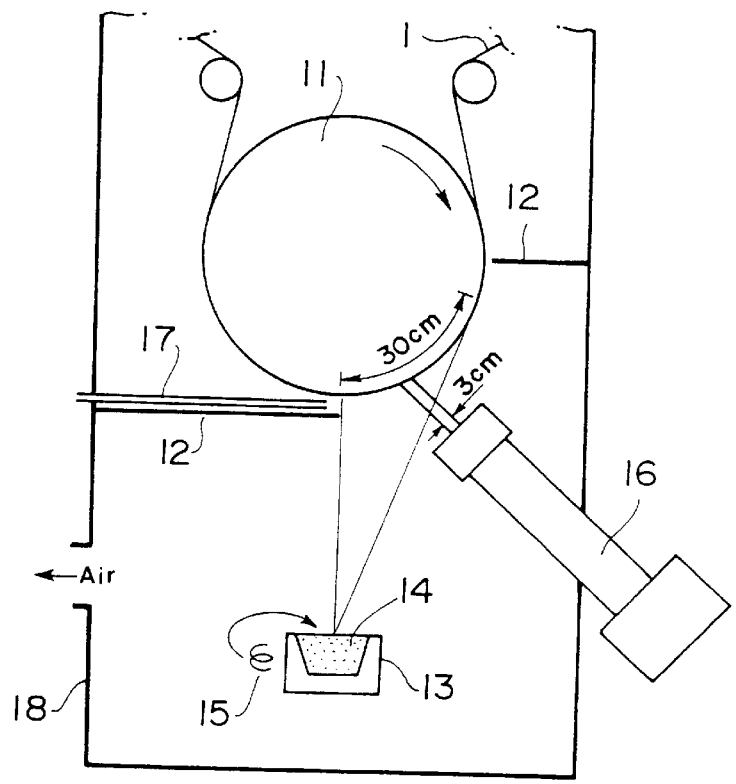
FIG. 2 and FIG. 3 are schematic views each showing an apparatus for producing a magnetic recording medium of the present invention.
Figure 3:
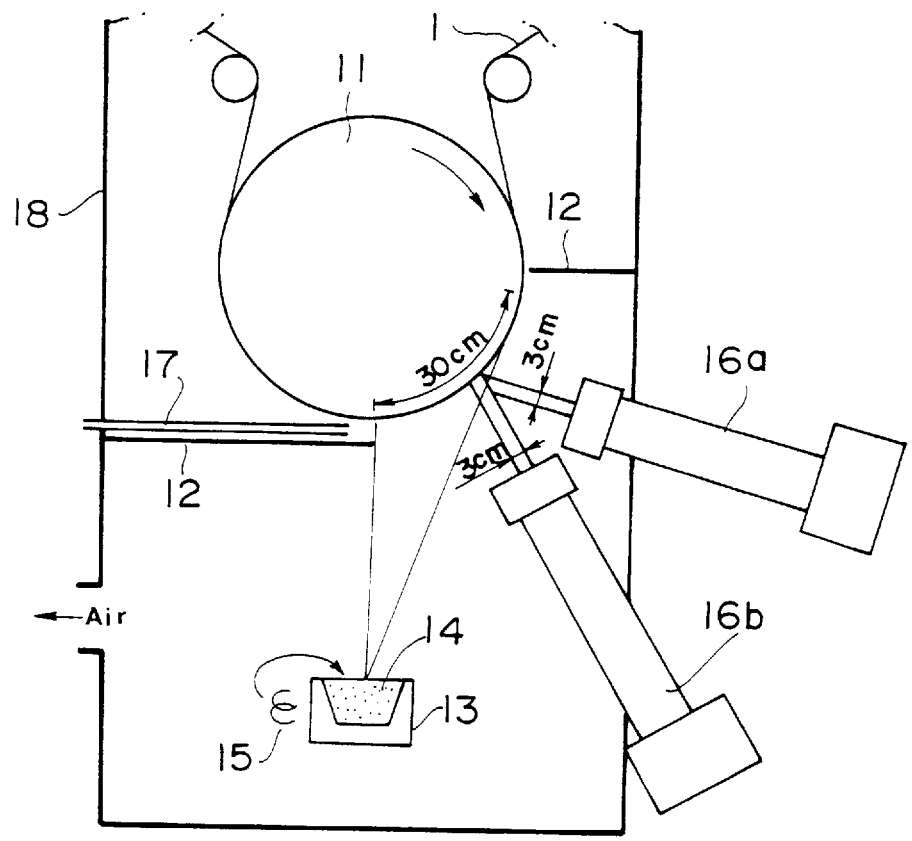

FIG. 2 and FIG. 3 show an ion assist oblique deposition apparatus used for the present invention.

Referring to FIG. 2 and FIG. 3, a reference numeral 11 denotes a cooling can roll for guiding the substrate 1. A reference numeral 12 denotes a shielding plate, 13 denotes a crucible formed of MgO, 14 denotes Fe having 99.95 wt. % purity, 15 denotes an electron gun, 16, 16a and 16b denote ion guns of Kaufman type, 17 denotes a nozzle through which oxygen gas is supplied and 18 denotes a vacuum tank.

The vacuum tank 18 is evacuated to a vacuum degree ranging from $10^{-4}$ to $10^{-6}$ Torr. Then the electron gun 15 starts operating to evaporate the Fe 14. Fe metallic particles are deposited on the substrate 1. An incident angle for oblique deposition is 30° to 80° (especially 45° to 70°). Nitrogen ions are irradiated to the deposited surface through the ion guns 16, 16a and 16b. Each of those ion guns 16, 16a and 16b is masked (narrowing down the aperture) so that nitrogen ion is supplied to the intermediate stage of the Fe deposition. Oxygen gas is also irradiated through the nozzle 17. The resultant magnetic layer is formed into the Fe—N—O magnetic layer which meets conditions required by the present invention. Supply amounts of the nitrogen ion and oxygen gas for introducing are so set that the magnetic layer meets conditions required by the present invention. In this process, normal ion assist oblique deposition is executed except that the amount for supplying nitrogen ion and the target point to which nitrogen ion is irradiated through the ion gun are specified. Activated nitrogen can be irradiated in place of nitrogen ion. Oxygen ions can be irradiated in place of oxygen gas.

The Fe—N—O magnetic layer 2 can be formed as a single layer or double or more layer. In case the Fe—N—O magnetic layer 2 has 2 or more layers, it is required that an outermost layer thereof meets the aforementioned condition. Other magnetic layers such as Co magnetic layer or Co—Ni magnetic layer can be provided in addition to the Fe—N—O magnetic layer 2.

The protective layer 3 is formed of an oxide, nitride or carbide. For example, Carbon materials such as glass-like carbon, diamond-like carbon, boron carbide, silicon nitride or the like can be used as the protective layer 3. It is preferable to use the diamond-like carbon to form the protective layer.

Various types of materials can be used as the lubricant. Preferably a fluorine-contained lubricant including carboxyl group denatured perfluoro polyether such as —$(C(R)F—CF_2—O)_p$— (where R represents the group such as F, $CF_3$, $CH_3$ or the like), particularly HOOC—$CF_2(O—C_2F_4)_p$ $(OCF_2)_q$—$OCF_2$—COOH, F—$(CF_2CF_2CF_2O)_n$—$CF_2CF_2COOH$ and alcohol denatured perfluoro polyether such as HOCH$_2$—$CF_2(O—C_2F_4)_p(OCF_2)_q$—$OCF_2$—$CH_2OH$, HO—$(C_2H_4—O)_m$—$CH_2$—$(OC_2F_4)_p(OCF_2)_q$—$OCH_2$—$(OCH_2CH_2)_n$—OH, F—$(CF_2CF_2CF_2O)_n$—$CF_2CF_2CH_2OH$ or the like can be used. More specifically, FOMBLIN Z DIAC, FOMBLIN Z DOL produced by Audimont Co. and Demnam SA produced by Daikin Industries Co., have been used.

A reference numeral 5 is a back coat layer coated on the other surface of the substrate 1 which contains carbon black and the like and has a thickness ranging from 0.1 to 1 μm. The back coat layer 5 can be formed through depositing the metal such as Al—Cu alloy or the like.

[EXAMPLE-1]

This example used an apparatus shown in FIG. 2. The aperture of the ion gun 16 was masked to 3 cm. A PET film 1 having a thickness of 10 μm was set in an ion assist oblique deposition apparatus. The PET film 1 was set to run at 2 m/minute guided by the cooling can roll 11. The vacuum tank 18 was evacuated until the vacuum degree became $8.8\times10^{-5}$ Torr. Then the Fe 14 contained in the crucible 13 was heated with electron beam radiated from the electron gun 15 (output: 30 kw) for melting and evaporation. As a result, a magnetic layer was formed on the PET film 1. Nitrogen ions radiated toward the magnetic layer through the ion gun 16 (output: 400 w). The ion gun 16 was provided with 20 sccm of nitrogen gas. Oxygen gas radiated through the nozzle 17 to the magnetic layer. The oxygen gas (5 sccm) was supplied through the nozzle 17. Then Fe—N—O metallic magnetic layer 2 was formed on the PET film 1.

The thickness of the magnetic layer measured 1980 Å through a level meter of tracer type ("Taristep" produced by Ranktailer Hobson Co.).

A diamond-like carbon 3 was formed on the Fe—N—O metallic magnetic layer 2 through ECR plasma CVD process.

A lubricant layer 4 was formed by applying a fluorine-contained lubricant such as perfluoro polyether (trade name: FOMBLIN AM2001) to the surface of the diamond-like carbon layer 3.

The another surface of the PET film 1 was coated with an Al deposited layer (back coat layer) 5 having a thickness of 0.2 μm.

Then obtained magnetic recording medium was cut into a tape each having a width of 8 mm for loading in a cassette.

The above-formed magnetic tape was subjected to measurement with an Auger electron spectroscopic analysis unit (Micro LAB produced by VGScience). Measurement conditions are as follows.

Electron gun; Accelerated voltage: 10 kV, Emission current: 10 nA, Magnification: ×2000

Etching condition; Etching gas: Argon, Accelerated voltage: 3 kV, Ion current: 300 nA, Etching was executed at an interval of 30 seconds.

Figure 4:
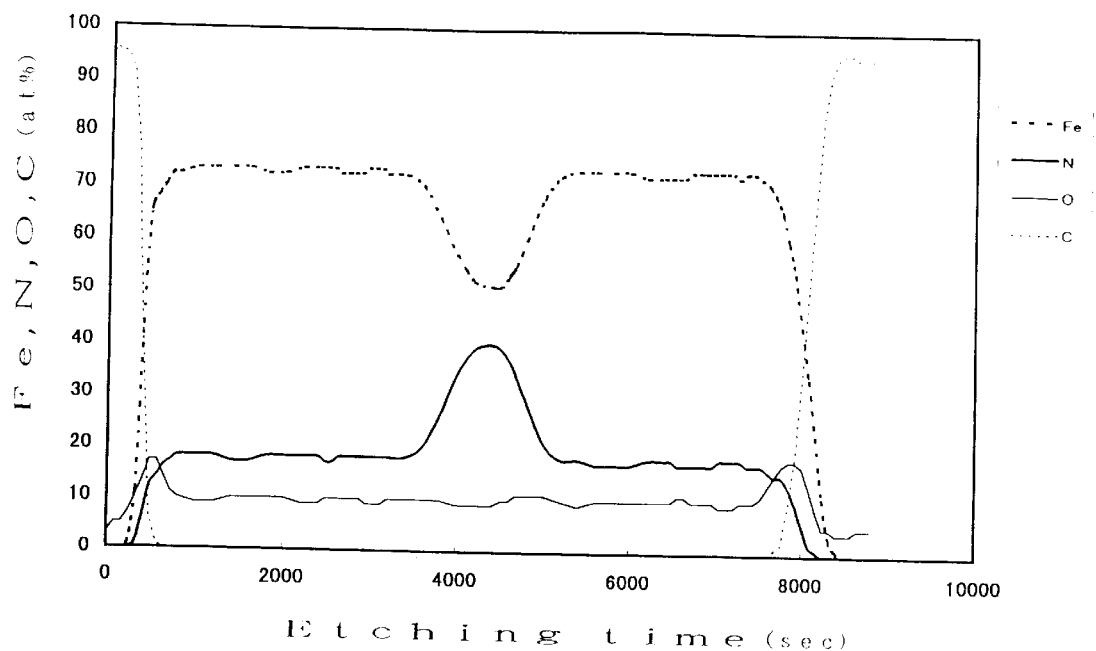
FIGS. 4 to 6 are Auger profiles of the respective magnetic tapes of the present invention.

FIG. 4 shows a profile obtained from Auger electron spectroscopic analysis, taking each Fe density (Fe/(Fe+N+O+C), at. %), N density (N/(Fe+N+O+C), at. %), O density (O/(Fe+N+O+C), at. %) and C density (C/(Fe+N+O+C), at.

%) (Fe+N+O+C=100%) as an axis of ordinate and taking the etching time (depth measured from the surface) as an axis of abscissa.

The Auger profile shown in FIG. 4 was derived from the magnetic tape having the magnetic layer 2 coated with a protective layer (diamond-like carbon layer) 3 and a lubricant layer 4. The Auger profile of FIG. 4 observes only C at a start point of spattering. At this point, Fe or N was not detected. Those Fe and N were gradually detected accompanied with development of spattering. Therefore it is difficult to determine the exact point from where formation of the magnetic layer 2 is initiated. In this example, the point in the Auger profile when the C density (main content of the protective layer) got 50% was set as an interface between the magnetic layer 2 and the protective layer 3. Similarly the point in the Auger profile where the C density (main content of the substrate) got 50% was set as an interface between the magnetic layer 2 and the substrate 1.

In the Auger profile, N at. % has a peak in an intermediate layer section of the magnetic layer. That is the peak represents a maximum value N1 (40 at. %) of the N density distribution in the area ranging from 500 to 1500 Å (especially about 1100 Å) deep from the surface of the magnetic layer. A half value width of the peak (the area where N density is equal to or more than half of the N1) resulted in 340 Å. The N density in the upper layer section of the magnetic layer ranged from 14 to 18 at. %. The N density in the lower layer section of the magnetic layer ranged from 11 to 18 at. %. The Fe density (Fe at. %) decreased at a point of the N1. The O density (O at. %) had peaks in both upper layer and lower layer sections of the magnetic layer. Each Fe density, N and O contained in the magnetic layer as a whole was 69 at. %, 21 at. % and 10 at. %, respectively.

[EXAMPLE-2]

In this example, an apparatus shown in FIG. 3 was used. Each aperture of the ion guns 16a and 16b was masked to 3 cm. Each supply amount of nitrogen gas to those ion guns 16a and 16b was 20 sccm, respectively. The supply amount of oxygen gas through the nozzle 17 was 5 sccm. The magnetic tape was prepared according to steps executed for Example-1.

The magnetic layer was 1800 Å thick.

The prepared magnetic tape was subjected to measurement with Micro LAB in the same manner as in Example-1. The profile resulted from Auger electron spectroscopic analysis is shown in FIG. 5.

Figure 5:
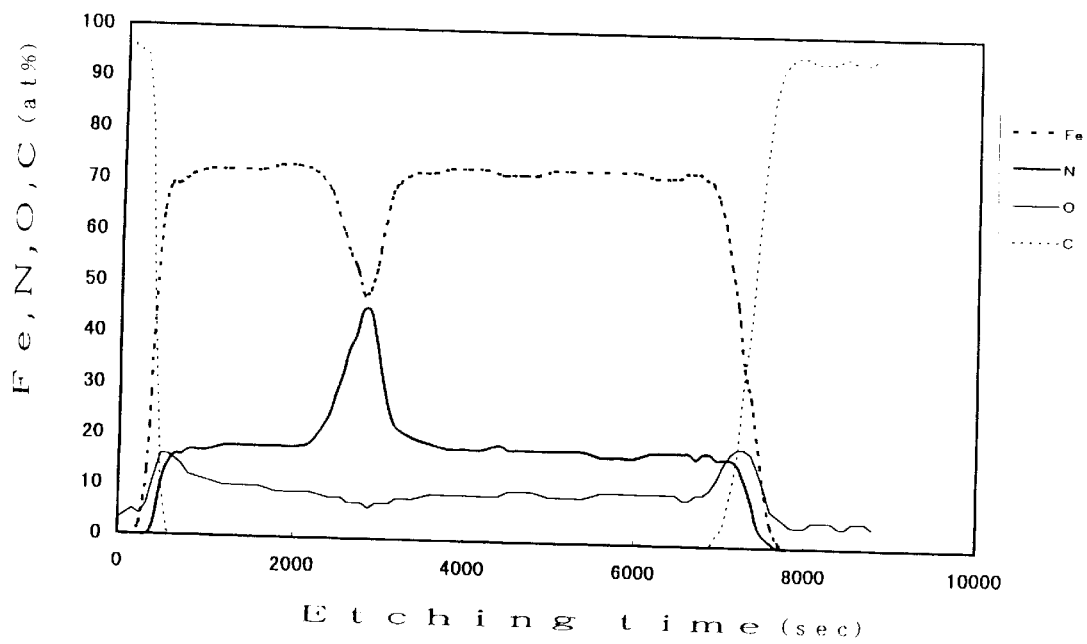

As shown in FIG. 5, the N density in an intermediate layer section of the magnetic layer has a peak. The peak represents a maximum value N1 (45 at. %) of N density distribution in the area 500 to 1500 Å (particularly about 710 Å) deep from the surface of the magnetic layer. A half value width of the peak was 210 Å. The N density in the upper layer section of the magnetic layer ranged from 10 to 18 at. %. The N density in the lower layer section of the magnetic layer ranged from 16 to 18 at. %.

The Fe density decreased at the point of N1. The O density in each upper layer section and lower layer section of the magnetic layer observed peaks.

Each Fe density, N and O contained in the magnetic layer as a whole measured 70 at. %, 19 at. % and 11 at. %, respectively.

[EXAMPLE-3]

The magnetic tape was prepared in the same manner as in Example-1 except that the supply amount of nitrogen gas to the ion gun 16 was 15 sccm.

The magnetic layer was 1740 Å thick.

The prepared magnetic tape was subjected to measurement with Micro LAB in the same manner as in Example-1.

Figure 6:
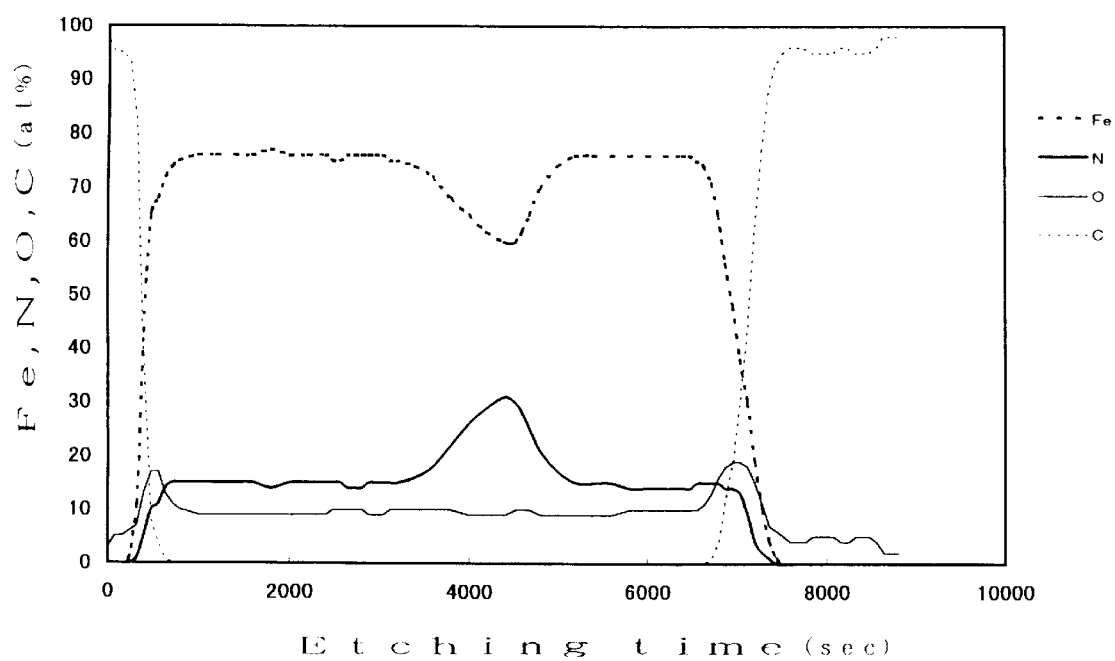

The profile resulted from Auger electron spectroscopic analysis is shown in FIG. 6.

Referring to FIG. 6, the N density in the intermediate layer section of the magnetic layer observed a peak. This peak represents a maximum value N1 (31 at. %) of N density distribution in the area 500 to 1500 Å (particularly about 1100 Å) deep from the magnetic layer surface.

The half value width of the peak measured 430 Å. The N density in the upper layer section of the magnetic layer ranged from 10 to 15 at. %. The N density in the lower layer section of the magnetic layer ranged from 14 to 15 at. %.

The Fe density decreased at the point of N1.

The O density in each upper layer section and lower layer section of the magnetic layer observed peaks. Each Fe density, N and O contained in the magnetic layer as a whole was 73 at. %, 17 at. % and 10 at. %, respectively.

[Comparison-1]

Figure 7:
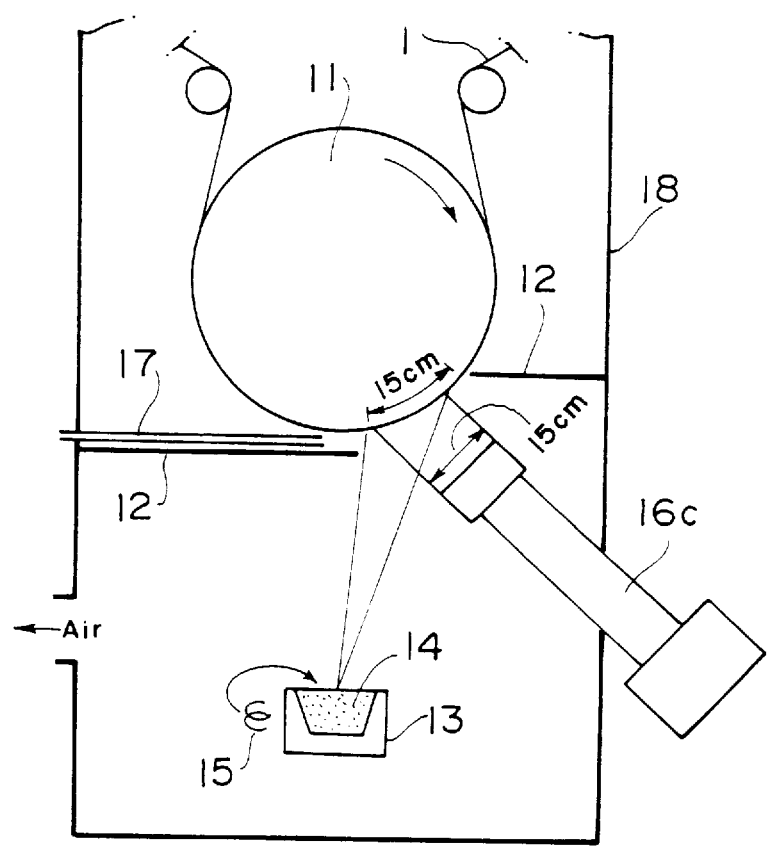
FIG. 7 is a schematic view of an apparatus for producing the magnetic recording medium of a comparative example.

An apparatus shown in FIG. 7 was used.

The aperture of the ion gun 16 was 15 cm. The PET film 1 was set to run at 0.5 m/minute. The supply amount of nitrogen gas to the ion gun 16 was 20 sccm. The supply amount of oxygen gas through the nozzle 17 was 5 sccm. The magnetic tape was prepared in the same manner as in Example-1.

The prepared magnetic tape was subjected to measurement with Micro LAB in the same manner as in Example 1. The profile resulted from Auger electron spectroscopic analysis is shown in FIG. 8.

Figure 8:
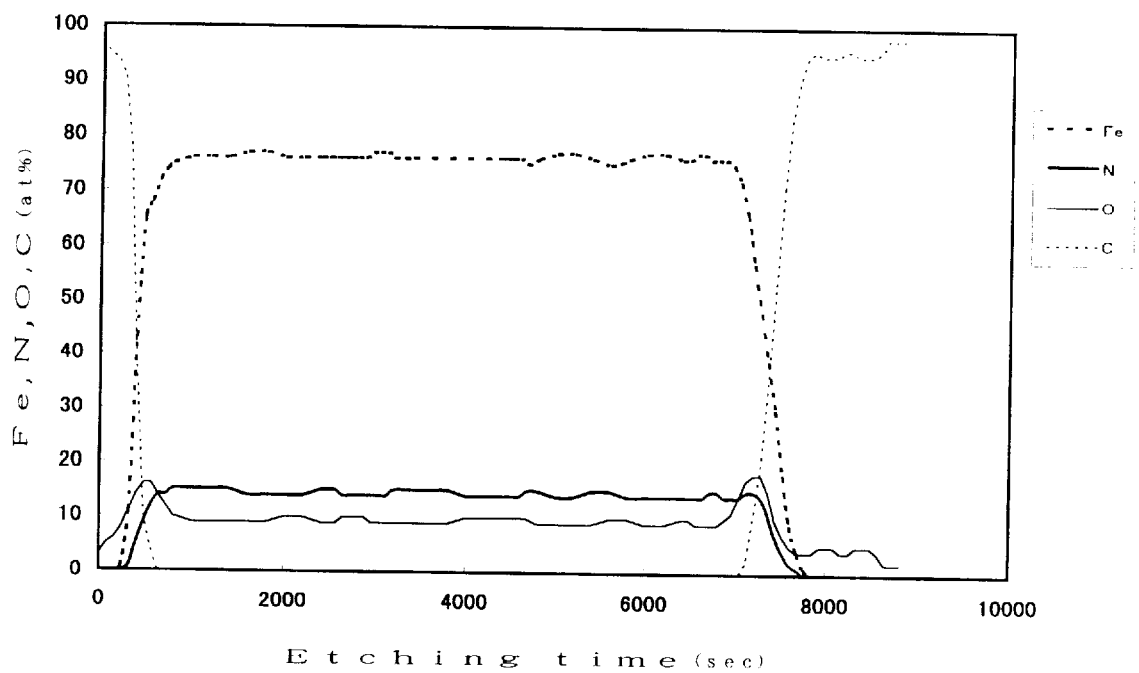
FIG. 8 is an Auger profile of a magnetic tape of the comparative example.

In FIG. 8, the N density in the intermediate layer section of the magnetic layer has no peak. This means that the N density contained in each section of the magnetic layer was kept constant.

Each Fe density, N and O contained in the magnetic layer was 65 at. %, 17 at. % and 18 at. %, respectively.

[Characteristic]

Each C/N value of the above-obtained respective magnetic tapes is shown in Table-1

TABLE 1

|  | C/N at a low frequency (f = 170 KHz) | C/N at a high frequency (f = 7.7 MHz) |
|---|---|---|
| E-1 | 0.1 dB | 1.8 dB |
| E-2 | −0.1 dB | 1.1 dB |
| E-3 | 0.0 dB | 0.9 dB |
| C-1 | 0.0 dB | 0.0 dB |

\* The C/N characteristic was obtained as follows. Signals from an oscillator were input to a device as a modified commercial 8 mm VTR. Those signals were recorded on a tape through a recording head. The recorded signals were then reproduced so as to be analyzed about signal level vs frequency with a spectrum analyzer. The ratio of an output $f_{out}$ of the recording frequency f to a noise level $N_0$ at (f−1) MHz, $[f_{out}-N_0]$, was set as the C/N value. The Comparison-1 was presented as a reference (0 dB).

The above Table-1 indicates that the magnetic tape of the present invention exhibits excellent C/N characteristic at a high frequency.

What is claimed is:

1. A magnetic recording medium comprising a substrate and a magnetic layer, wherein:

said magnetic layer is formed on said substrate;

said magnetic layer is an Fe—N—O magnetic layer;

a distribution of N density in a depth direction of said Fe—N—O magnetic layer has a maximum value N1 in an intermediate layer section of said Fe—N—O magnetic layer;

said maximum value N1 ranges from 20 to 50 at. %; and an area where a density value is equal to or more than half of said maximum value N1 ranges from 100 to 500 Å in a depth direction of said Fe—N—O magnetic layer.

2. The magnetic recording medium of claim 1, wherein said maximum value N1 ranges from 23 to 48 at. %.

3. The magnetic recording medium of claim 1, wherein said area where a density value is equal to or more than half of said maximum value N1 ranges from 200 to 450 Å.

4. The magnetic recording medium of claim 1, wherein said maximum value N1 exists at a point 500 to 2000 Å deep from a surface of said magnetic layer.

5. The magnetic recording medium of claim 1, wherein said maximum value N1 exists at a point 600 to 1500 Å deep from a surface of said magnetic layer.

6. The magnetic recording medium of claim 1, wherein said maximum value N1 exists in a range from 1/3 to 2/3 depth of a thickness of said magnetic layer.

7. The magnetic recording medium of claim 1, wherein each of said distribution of N density in an upper layer section and lower layer section of said magnetic layer is less than 20 at. %, respectively.

8. The magnetic recording medium of claim 1, wherein Fe density becomes low at a point of said maximum value N1.

9. The magnetic recording medium of claim 1, wherein said magnetic layer has a thickness ranging from 800 to 5000 Å.

10. The magnetic recording medium of claim 1, wherein said magnetic layer has a thickness ranging from 1000 to 3000Å.

11. The magnetic recording medium of claim 1, wherein said magnetic layer contains 45 to 90 at. % of Fe, 5 to 50 at. % of N and 5 to 40 at. % of O.

12. The magnetic recording medium of claim 1, wherein said magnetic layer contains 60 to 80 at. % of Fe, 10 to 30 at. % of N and 10 to 20 at. % of O.

13. The magnetic recording medium of claim 1, wherein a protective layer is formed on said magnetic layer.

14. The magnetic recording medium of claim 1, wherein a lubricant layer is formed on said magnetic layer.

15. The magnetic recording medium of claim 1, wherein a protective layer is formed on said magnetic layer and a lubricant layer is formed on said protective layer.

* * * * *